(12) United States Patent
Villers

(10) Patent No.: US 6,609,354 B1
(45) Date of Patent: Aug. 26, 2003

(54) METHOD FOR LONG TERM STORAGE OF A BULK BIOLOGICALLY ACTIVE COMMODITY

(75) Inventor: Philippe Villers, Concord, MA (US)

(73) Assignee: GrainPro, Inc., Concord, MA (US)

( * ) Notice: Subject to any disclaimer, the term of this patent is extended or adjusted under 35 U.S.C. 154(b) by 15 days.

(21) Appl. No.: 09/667,481

(22) Filed: Sep. 22, 2000

(51) Int. Cl.$^7$ ............................................... B65B 31/00
(52) U.S. Cl. ........................................ 53/434; 53/432
(58) Field of Search .......................... 53/432, 433, 434, 53/436, 437, 438, 439, 74, 427, 440; 426/595, 418

(56) References Cited

U.S. PATENT DOCUMENTS

| | | | | |
|---|---|---|---|---|
| 1,702,325 A | * | 2/1929 | Sickels | 53/432 |
| 2,423,358 A | * | 7/1947 | Wheaton et al. | 53/432 |
| 2,445,152 A | * | 7/1948 | Poole | 53/432 |
| 3,686,822 A | * | 8/1972 | Wolfelsperger | 53/427 |
| 3,945,171 A | * | 3/1976 | Marietta et al. | 53/79 |
| 4,055,931 A | * | 11/1977 | Myers | 53/510 |
| 4,069,349 A | * | 1/1978 | Shaw | 426/595 |
| 4,365,715 A | * | 12/1982 | Egli | 53/432 |
| 4,416,908 A | | 11/1983 | McKinney et al. | |
| 4,548,852 A | * | 10/1985 | Mitchell | 53/432 |
| 4,899,517 A | * | 2/1990 | Shima et al. | 53/432 |
| 4,957,753 A | * | 9/1990 | Bardsley et al. | 53/438 |
| 5,403,609 A | * | 4/1995 | Subotics et al. | 426/418 |
| 5,491,957 A | * | 2/1996 | Maskell | 53/432 |
| 5,794,408 A | | 8/1998 | Patouraux et al. | |
| 5,881,881 A | | 3/1999 | Carrington | |

FOREIGN PATENT DOCUMENTS

| | | |
|---|---|---|
| DE | 32 09 930 A1 | 9/1983 |
| DE | 38 32 390 A1 | 4/1990 |
| EP | 1 145 640 A1 | 10/2001 |
| FR | 2 611 669 | 9/1988 |
| FR | 2 643 231 | 8/1990 |
| FR | 2 795 055 A | 12/2000 |
| IL | 87301 | 3/1996 |
| JP | 60 149509 A | 8/1985 |
| JP | 02 268631 | 11/1990 |
| JP | 03 162268 | 7/1991 |
| JP | 04 087966 | 3/1992 |
| JP | 06 090660 | 4/1994 |
| JP | 07 284327 | 10/1995 |
| WO | WO 95/09770 | 4/1995 |
| WO | WO 02/44058 A2 | 6/2002 |

OTHER PUBLICATIONS

"Hermetic Cocoons Store High-Moisture Milled Rice," GrainPro News, vol. 3, Issue 2, Apr. 2001.

GrainPro Cocoon—For Agricultural and Economic Development or Humanitarian Relief, 1999. GrainPro, Inc. promotional brochure.

* cited by examiner

Primary Examiner—John Sipos
Assistant Examiner—Louis Huynh
(74) Attorney, Agent, or Firm—Hamilton, Brook, Smith & Reynolds, P.C.

(57) ABSTRACT

A method for long term storage of a bulk commodity utilizes a flexible, low gas-permeability sheet material enclosure in which the bulk commodity is hermetically sealed. The atmosphere in the sealed flexible sheet material enclosure is substantially evacuated to establish a vacuum therein. The vacuum is maintained during at least a portion of the long term storage of the bulk commodity. At least a portion of the bulk commodity is removed from the flexible, low gas-permeability sheet material enclosure by opening a hermetic seal therein.

12 Claims, 1 Drawing Sheet

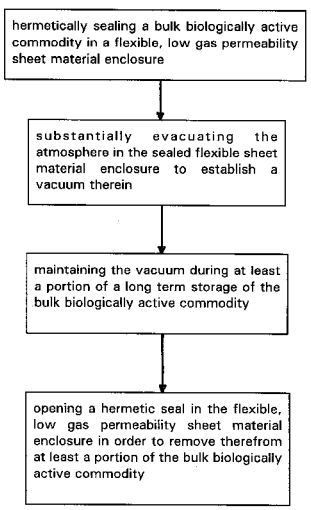

```
┌─────────────────────────────────────────┐
│ hermetically sealing a bulk biologically active │
│ commodity in a flexible, low gas permeability   │
│ sheet material enclosure                        │
└─────────────────────────────────────────┘
                    │
                    ▼
┌─────────────────────────────────────────┐
│ substantially   evacuating   the        │
│ atmosphere in the sealed flexible sheet │
│ material   enclosure   to   establish a │
│ vacuum therein                          │
└─────────────────────────────────────────┘
                    │
                    ▼
┌─────────────────────────────────────────┐
│ maintaining the vacuum during at least  │
│ a portion of a long term storage of the │
│ bulk biologically active commodity      │
└─────────────────────────────────────────┘
                    │
                    ▼
┌─────────────────────────────────────────┐
│ opening a hermetic seal in the flexible,│
│ low gas permeability sheet material     │
│ enclosure in order to remove therefrom  │
│ at least a portion of the bulk biologically │
│ active commodity                        │
└─────────────────────────────────────────┘
```

METHOD FOR LONG TERM STORAGE OF A BULK BIOLOGICALLY ACTIVE COMMODITY

BACKGROUND OF THE INVENTION

The present invention relates to storage of bulk commodities in loose or bagged form and, more particularly, to the long term storage of bulk commodities under a controlled environment.

Bulk storage of commodities such as, coffee, grains, fruits cocoa, and the like are subject to deleterious effects including extensive loss caused by insects in the commodity during storage, the effects of oxidation during storage produced, for example, by the growth of micro-organisms and/or fungi in the commodity and other impacts on the quality, nutrition purposes, safety, purity, appearance, taste, aroma and freshness of the commodity.

A well-known method for long term storage of a bulk commodity utilizes a hermetically sealed enclosure formed from a flexible, low gas-permeability set material employing the slow depletion of oxygen by respiration of live insects present in the commodity, and by the commodity itself. However, this process takes significant time and relies on a significant level of infestation to deplete the oxygen in addition, after the insects die, the oxygen level gradually rises due to infiltration thereby permitting various oxidation effects in the stored commodity.

Vacuum sealing of bulk commodities also has been rejected because of the perceived need for rigid and expensive pressure vessels.

It is accordingly, a general object of the invention to provide a method for long term storage of bulk commodities that obviates the above problems.

SUMMARY OF THE INVENTION

In the present invention, to insure the rapid kill of biological contaminant(s), such as insects, as well as to protect the commodity from oxygen-effected deterioration such as the growth of fungi and micro-organisms, a oxidation, the commodity is sealed within the enclosure after which the atmosphere therein is evacuated to establish a vacuum. The vacuum is maintained during at least a portion of the long term storage of the bulk commodity. Handling of the bulk commodity it achieved through selectively opening and closing an airtight seal in the enclosure formed by the flexible, low gas-permeability sheet material.

DESCRIPTION OF THE DRAWING

The single drawing is a flow diagram in block form of the method of the invention.

DESCRIPTION OF THE INVENTION

The steps of the invention are depicted in the FIGURE of the drawing. A bulk commodity is hermetically sealed in a flexible container or enclosure, such as tat formed from a 0.032 inch, low gas-permeability, UV resistant food grade PVC sheet material. A vacuum is established in the enclosure by using a conventional commercial vacuum pump and set point regulator. The flexible container or enclosure prevents excessive stresses when evacuated as would occur with a rigid container by conforming to the shape of the enclosed commodity. An opening, which can be opened or closed by means such as a solenoid-controlled inlet valve, is fed to an ordinary vacuum pump, with, if needed, an appropriate filter at the hermetically sealed container end to prevent clogging or damage to the pump. The vacuum pump is allowed to run for an extended period of time so that either or both oxygen and interstitial moisture inside are substantially removed, typically down to a vacuum of 25–100 mm Hg at room temperature representing an oxygen level equivalent to normal pressure of 3–13%. At this time the valve is closed, and the hermetically sealed container becomes a large "vacuum pack," with periodic pumping as required to compensate for residual infiltration of air, eliminating any of the respective causes of degradation named above due either to direct or indirect effects of oxygen. Further, any residual moisture in the absence of oxygen will not as easily cause moisture-produced damage. The damage to the commodity can be provided at least in part by the effect of heat produced by the commodity.

Removal of the commodity from the sealed enclosure can be made through a commercially available hermetic "zipper", such as, the zipper sold by ITW under the trademark MAXIGRIP, that is provided on the hermetic enclosure.

In a particular embodiment, a vacuum in the range of 25–100 mm of mercury is established in the enclosure at 20 degrees C. or higher as a function of a biological contaminant(s) and a desired kill time of the biological contaminant(s). The commodity can have a weight in the range of one-half to two hundred metric tons.

What I claim is:

1. A method for storing a bulk commodity under conditions wherein substantialy all biological contaminant(s) within the bulk commodity are killed during at least a portion of its storage, comprising;

(A) hermetically sealing said bulk commodity in a flexible, low gas-permeability sheet material enclosure to thereby store said bulk commodity, and thereafter, (B) maintaining said bulk commodity at a temperature of at least 20 degrees C. during said at least a portion of its storage in said flexible, low gas-permeability sheet material enclosure;

(C) substantially evacuating the atmosphere in said sealed flexible, low gas-permeability sheet material enclosure to establish a vacuum within the enclosure of about 25–100 mm of mercury during said at least a portion of its storage;

(D) maintaining, during said at least a portion of its storage, said vacuum at about 25–100 mm of mercury while said bulk commodity is maintained at the temperature of at least 20 degrees C. to kill substantially all of said biological contaminant(s) without generating heat; and (E) at the end of the storage opening a hermetic seal in said flexible, low gas-permeability sheet material enclosure in order to remove therefrom at least a portion of said bulk commodity.

2. The method of claim 1 wherein said storage is a time period in which serious biologically-active damage would occur if said bulk commodity were not protected from damage.

3. The method of claim 2 wherein said damage is insect infestation by insects already in said bulk commodity before it is sealed.

4. The method of claim 2 wherein said damage is produced at least in part by the effect of oxidation of said bulk commodity.

5. The method of claim 2 wherein said damage is produced at least in part by the effect of heat produced by said bulk commodity.

6. The method of claim 2 wherein said damage is produced at least in part by the effect of the growth of micro-organisms in said bulk commodity.

7. The method of claim 2 wherein said damage is produced at least in part by the effect of the growth of fungi in said bulk commodity.

8. The method of claim 1 wherein said bulk commodity has a weight in the range of one-half metric ton to two hundred metric tons.

9. The method of claim 1 wherein said flexible, low gas-permeability sheet material enclosure is a plastic.

10. The method of claim 9 wherein said plastic sheet material enclosure is a UV resistant PVC.

11. The method of claim 9 wherein said plastic sheet material enclosure has a thickness of at least 0.032 inches.

12. The method of claim 1 further comprising maintaining said vacuum during said storage of said bulk commodity.

* * * * *